United States Patent
Chen

(10) Patent No.: US 12,489,301 B2
(45) Date of Patent: Dec. 2, 2025

(54) CHARGING METHOD, ELECTRONIC DEVICE AND STORAGE MEDIUM

(71) Applicant: Beijing Xiaomi Mobile Software Co., Ltd., Beijing (CN)

(72) Inventor: Yichun Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 941 days.

(21) Appl. No.: 17/682,475

(22) Filed: Feb. 28, 2022

(65) Prior Publication Data

US 2023/0120651 A1 Apr. 20, 2023

(30) Foreign Application Priority Data

Oct. 19, 2021 (CN) .......................... 202111214015.4

(51) Int. Cl.
*H02J 7/00* (2006.01)
*H02J 7/14* (2006.01)

(52) U.S. Cl.
CPC ...... *H02J 7/00034* (2020.01); *H02J 7/00712* (2020.01)

(58) Field of Classification Search
CPC ...... H02J 7/00034; H02J 7/00712; H02J 7/00; H02J 7/0036; H02J 7/00045; H02J 7/0032; H02J 7/0013; H02J 50/00; H02J 50/10; H02J 50/80
USPC ........................................................ 320/134
See application file for complete search history.

(56) References Cited

U.S. PATENT DOCUMENTS

| 5,506,490 A * | 4/1996 | DeMuro | G06F 1/263 |
| | | | 363/143 |
| 8,497,662 B2 * | 7/2013 | Aradachi | H02J 7/00047 |
| | | | 320/124 |
| 10,277,050 B2 * | 4/2019 | Huang | H02J 7/02 |
| 2001/0000212 A1 * | 4/2001 | Reipur | H02J 7/00712 |
| | | | 320/106 |
| 2008/0238361 A1 * | 10/2008 | Pinnell | H02J 7/04 |
| | | | 320/162 |

(Continued)

FOREIGN PATENT DOCUMENTS

| CN | 102938572 A | 2/2013 |
| CN | 203014439 U | 6/2013 |

(Continued)

OTHER PUBLICATIONS

European Search Report issued on Aug. 26, 2022 for European Patent Application No. 22158930.2.

*Primary Examiner* — Alexis B Pacheco
(74) *Attorney, Agent, or Firm* — Volpe Koenig

(57) ABSTRACT

A charging method includes recognizing a type of a charging device in response to being connected to the charging device. The types of the charging devices include an adaptive-type charging device and a non-adaptive-type charging device. A charging mode corresponding to the type of the charging device is determined. Charging modes include at least a first mode and a second mode. A charging voltage of the first mode can reach a first threshold voltage. A charging voltage of the second mode can reach a second threshold voltage. The first threshold voltage is greater than a rated voltage of a battery. The rated voltage is greater than the second threshold voltage. The method includes charging an electronic device according to the determined charging mode.

16 Claims, 3 Drawing Sheets

(56) References Cited

U.S. PATENT DOCUMENTS

| | | | |
|---|---|---|---|
| 2013/0086409 A1* | 4/2013 | Lu | H04L 12/66 713/340 |
| 2014/0360512 A1* | 12/2014 | Xiang | H02J 7/00712 131/328 |
| 2015/0127278 A1* | 5/2015 | Yang | H02J 7/0049 702/60 |
| 2017/0085098 A1 | 3/2017 | Sporck et al. | |
| 2017/0289334 A1* | 10/2017 | Tian | H02J 7/00 |
| 2018/0013295 A1 | 1/2018 | Sporck et al. | |
| 2018/0048170 A1 | 2/2018 | Sun et al. | |
| 2018/0166902 A1 | 6/2018 | Huang et al. | |
| 2018/0254648 A1 | 9/2018 | Harju | |
| 2018/0351384 A1* | 12/2018 | Koyama | H02J 7/0071 |
| 2019/0260212 A1* | 8/2019 | Li | H02J 7/00047 |
| 2019/0288520 A1* | 9/2019 | Abdel-Monem | G01R 31/392 |
| 2020/0119581 A1* | 4/2020 | Kim | H02J 7/0068 |
| 2020/0343777 A1* | 10/2020 | Jia | H02J 50/12 |
| 2021/0104899 A1* | 4/2021 | Chai | H04M 15/65 |
| 2021/0111566 A1 | 4/2021 | Wu et al. | |
| 2021/0376618 A1* | 12/2021 | Chen | H01M 10/441 |
| 2022/0102995 A1* | 3/2022 | Fieldbinder | H02J 7/00036 |

FOREIGN PATENT DOCUMENTS

| | | |
|---|---|---|
| CN | 103560556 A | 2/2014 |
| CN | 106537719 A | 3/2017 |
| CN | 106655344 A | 5/2017 |
| CN | 107612052 A | 1/2018 |
| CN | 107769306 A | 3/2018 |
| CN | 107769320 A | 3/2018 |
| CN | 108233451 A | 6/2018 |
| CN | 105978093 B | 9/2018 |
| CN | 108539808 A | 9/2018 |
| CN | 109004708 A | 12/2018 |
| CN | 109327055 A | 2/2019 |
| CN | 110718948 A | 1/2020 |
| CN | 111262299 A | 6/2020 |
| CN | 113241810 A | 8/2021 |

* cited by examiner

CHARGING METHOD, ELECTRONIC DEVICE AND STORAGE MEDIUM

CROSS REFERENCE TO RELATED APPLICATION

This application claims the benefit of priority to Chinese Application No. 2021112140154 filed on Oct. 19, 2021, the contents of which are incorporated herein by reference in their entirety.

BACKGROUND

With the development of charging technology, the charging power of electronic devices is growing. User requirements for faster charging speed are increasing as well. Charging is most efficient when an electronic device is charged via an adaptive charger.

SUMMARY

The disclosure provides a charging method, an electronic device, and a storage medium.

According to a first aspect of an example of the disclosure, a charging method is provided. The charging method is performed by an electronic device. The method includes: recognizing a type of a charging device in response to being connected to the charging device. Types of the charging devices include an adaptive-type charging device and a non-adaptive-type charging device. The method further includes determining a corresponding charging mode according to the type of the charging device. There are at least two types of charging modes: a first mode and a second mode. In the first mode, a charging voltage can reach a first threshold voltage. In the second mode, a charging voltage can reach a second threshold voltage. The first threshold voltage is greater than a rated voltage of a battery, and the rated voltage of the battery is greater than the second threshold voltage. The method further includes charging the electronic device in the determined charging mode.

According to a second aspect of an example of the disclosure, an electronic device is provided. The electronic device includes: a processor and a memory configured to store processor-executable instructions. The processor is configured to execute the processor-executable instructions to configure the processor to perform any of the charging methods described herein.

According to a third aspect of the example of the disclosure, a non-transitory computer readable storage medium is provided. Instructions in the storage medium, when executed by a processor of an electronic device, configure the electronic device to perform the activities corresponding to the charging methods described above.

It should be understood that the above general descriptions and the following detailed descriptions are explanatory, and are not intended to limit the disclosure.

BRIEF DESCRIPTION OF THE DRAWINGS

The accompanying drawings, which are incorporated in and constitute a part of this specification, illustrate examples consistent with the disclosure and together with the specification, they serve to explain the principles of the disclosure.

DETAILED DESCRIPTION

Figure 1:
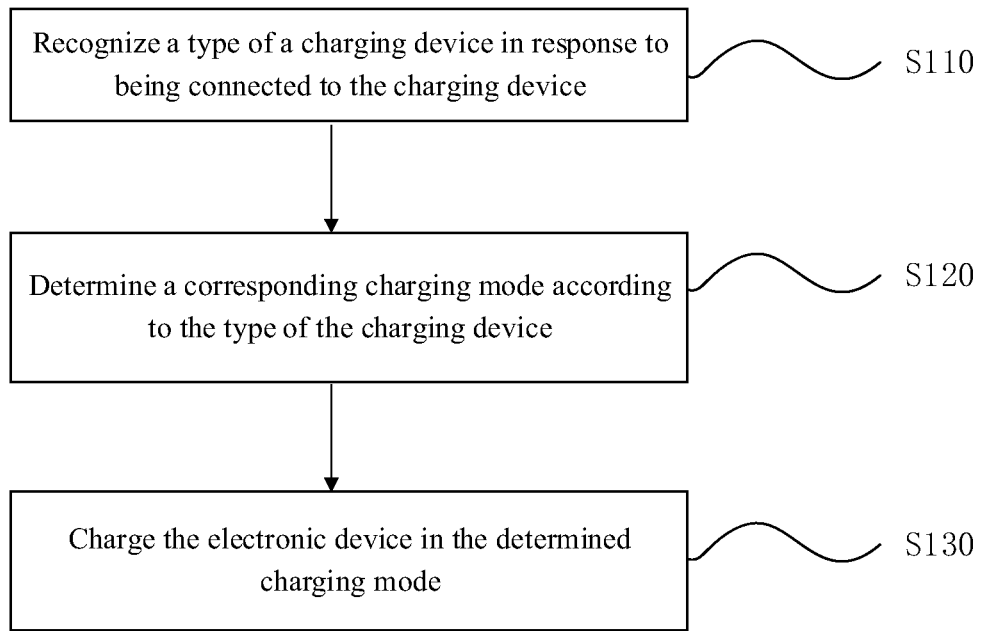
FIG. 1 is a flow diagram of a method according to an example.

Examples will be described in detail herein and illustrated in the accompanying drawings. When the description refers to the accompanying drawings, the same numbers in different accompanying drawing figures represent the same or similar elements unless otherwise indicated. The implementations described in the following examples do not represent all possible implementations consistent with the disclosure. On the contrary, they are merely examples of an apparatus and a method consistent with some aspects of the disclosure.

In the related art, there are many types of chargers. Sometimes, when charging the electronic device, a charger selected to charge the electronic device is not an adaptive charger for the electronic device under charge. In that case, there can be a problem, that is, the electronic device cannot be appropriately charged using the non-adaptive charger.

In the related art, when a non-adaptive charger is connected for charging an electronic device, the electronic device cannot implement fast charging, even though the electronic device may support the fast charging. There are also problems of being unable to charge at all. Or, the device may experience significant heating. These problems result in a user experience that is less than optimal.

There are several reasons for such problems. First, a charging voltage of part of the non-adaptive chargers might not reach a high-voltage threshold, and in that case, the electronic device cannot be charged in a high-voltage mode. Second, the charging voltage of part of the non-adaptive chargers might not reach a low-voltage threshold, and in that case, the electronic device cannot be charged in a low-voltage mode. Third, in a case where the above-mentioned first or second problems exist, a charging-break mode is usually adopted in the related art. The charging-break mode means that a charging process of the electronic device is stopped. The charging process could stop in a number of ways. For example, it may be that the electronic device stops receiving power from a charging device, or the charging device may be switched to a protective mode and may stop supplying power to the electronic device altogether. Thus, an electronic device cannot be charged in the charging-break mode. In addition, a default charging mode may also be adopted. Under the default charging mode, a charging efficiency is lost. The extra work expended by the device is released as heat. This can result in serious heating of the electronic device.

This disclosure provides examples of a charging method performed by an electronic device. The method includes recognizing a type of a charging device in response to being connected to the charging device. The types of charging devices include an adaptive-type charging device and a non-adaptive-type charging device. The method includes determining a corresponding charging mode according to the type of the charging device. The charging mode can include at least a first mode and a second mode. A charging voltage of the first mode can reach a first threshold voltage. A charging voltage of the second mode can reach a second threshold voltage. The first threshold voltage is greater than a rated voltage of a battery. The rated voltage of the battery is greater than the second threshold voltage.

The method includes charging the electronic device in the determined charging mode. According to the disclosed method, the electronic device recognizes the type of the connected charging device, and the charging mode is dynamically adjusted according to the recognized type of the charging device. Thus, the electronic device may be charged in a compatible charging mode, and a user experience is improved. In an example, the charging method according to the disclosure is performed by the electronic device. The electronic device may be a mobile phone, a tablet computer, an intelligent wearable device, or other electronic devices.

As shown in FIG. 1, the method according to the present example includes the following steps. In S110, a type of a charging device is recognized in response to being connected to the charging device. In S120, a corresponding charging mode is determined according to the type of the charging device.

In S130, the electronic device is charged in the determined charging mode. In step S110, the type of the charging device can be an adaptive-type charging device or a non-adaptive-type charging device. The charging device may include: a wireless charger, a wired charger, or a portable charging device. An example of the disclosure illustrates an instance in which the charging device is a wired charger. In this step, the charging device is connected to the electronic device using a charging cable. The connection between the charging device and the electronic device complies with a power delivery (PD) charging protocol, and data transmission may be performed based on the PD protocol.

After the electronic device detects that the charging device is plugged in and connected to the electronic device, the electronic device may obtain a device identifier of the charging device in accordance with the PD protocol, so as to recognize the type of the charging device according to the device identifier. For example, if the device identifier is the same as a prestored identifier in the electronic device, the type of the charging device is the adaptive-type charging device. If the device identifier is different from the prestored identifier in the electronic device, the type of the charging device is the non-adaptive-type charging device.

In step S120, the charging mode at least includes a first mode and a second mode. A charging voltage of the first mode can reach a first threshold voltage. In the context of the first mode, the term "reach" refers to the charging voltage in the first mode becoming equal to or greater than a first threshold voltage. A charging voltage of the second mode can reach a second threshold voltage. In the context of the second mode, "reach" refers to the charging voltage in the second mode becoming equal to or smaller than a second threshold voltage. The first threshold voltage is greater than a rated voltage of a battery. The rated voltage of the battery is greater than the second threshold voltage.

In step S120, the corresponding charging mode may vary according to various types of the charging devices. In a case where the charging device is the adaptive-type charging device, the corresponding charging mode is the first mode. In a case where the charging device is the non-adaptive-type charging device, the corresponding charging mode is the first mode or the second mode. In a case where the charging device is the non-adaptive-type charging device, the corresponding charging mode may be determined with consideration given to its load capacity. This will be described in detail in the following examples.

In step S120, the rated voltage of the battery may refer to a maximum voltage of the battery, for example, 4.5 V. The first mode may be a Switching mode. In the Switching mode, the first threshold voltage is set to be about twice the rated voltage, for example, 9 V or 10 V. That is, in the Switching mode, the voltage of the charging device and the voltage of the battery of the electronic device may be interdependent.

The second mode may be a Bypass mode. In the Bypass mode, the second threshold voltage is smaller than the rated voltage. In one example, the second threshold voltage is set to be a minimum voltage of the battery. For example, the second threshold voltage is set to be 3.6 V. In another example, the second threshold voltage is set to equal a minimum voltage of the battery plus a voltage difference. The voltage difference may be determined according to a charging current. For example, the voltage difference is set to be 0.2 V. In that case, the second threshold voltage may be set to 3.8 V. In the bypass mode, the voltage of the charging device and the voltage of the battery of the electronic device may differ by, e.g., one voltage difference.

In step S130, the electronic device itself may determine the charging voltage and may do so according to the determined charging mode. The electronic device communicates the charging voltage to the charging device based on the PD protocol. The charging device outputs to the electronic device a voltage corresponding to the charging voltage, wherein the battery of the electronic device is charged with the charging voltage.

In this step, in the first mode, the charging voltage for the electronic device may be a high voltage, and the charging voltage may maximally reach the first threshold voltage. Or, the charging voltage is related to a current voltage of the battery, and may be controlled to be twice the current voltage at all times. For example, the current voltage of the battery is 4 V, and thus the output voltage of the charger in the first mode may be 8 V.

In this step, in the second mode, the charging voltage for the electronic device may be a low voltage, and the charging voltage may minimally reach the second threshold voltage. Or, the charging voltage is relevant to the current voltage of the battery, and may be controlled to be higher than the current voltage by a difference of one voltage difference at all times. For example, the current voltage of the battery is 4 V, and thus the charging voltage is 4.2 V.

Figure 2:
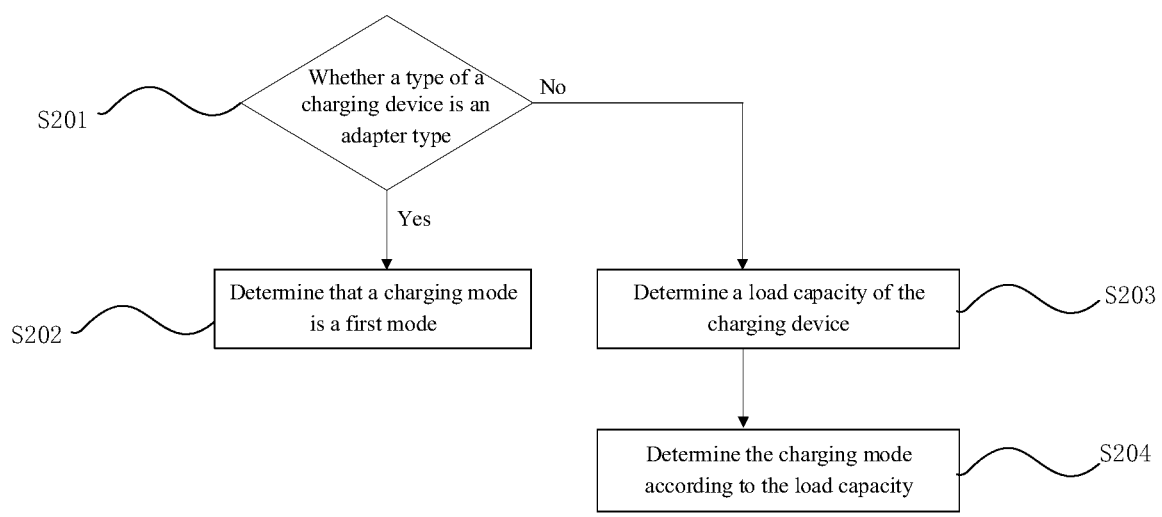
FIG. 2 is a flow diagram of a method according to an example.

In an example, the method includes steps S110 to step-S130. As shown in FIG. 2, step S120 may include the following steps. In S201, it is judged whether the type of the charging device is the adaptive-type charging device. If the type of the charging device is the adaptive-type charging device, step S202 is executed, and if the type of the charging device is the non-adaptive-type charging device, steps S203 to S204 are executed.

In S202, in response to the type of the charging device being the adaptive-type charging device, it is determined that the charging mode is the first mode. In this step, in response to the charging device being the adaptive-type charging device, the electronic device makes the determination that the charging mode is the first mode. The first mode may be adopted for charging in step S130. In a process of charging in the first mode, the charging voltage may be controlled to be twice the current voltage of the battery at all times. In this example, the charging efficiency may reach about 95%. Accordingly, the charging speed is fast, and the user experience is good.

In S203, a load capacity of the charging device is determined in response to the type of the charging device being determined as the non-adaptive-type charging device. In S204, the charging mode is determined according to the load capacity. In step S203, if the charging device is the nonadaptive-type charging device, the corresponding charging mode may be either the first mode or the second mode. The electronic device further determines the load capacity of the charging device. The load capacity can reflect a maximum charging voltage capability or a minimum charging voltage capability of the charging device.

Figure 3:
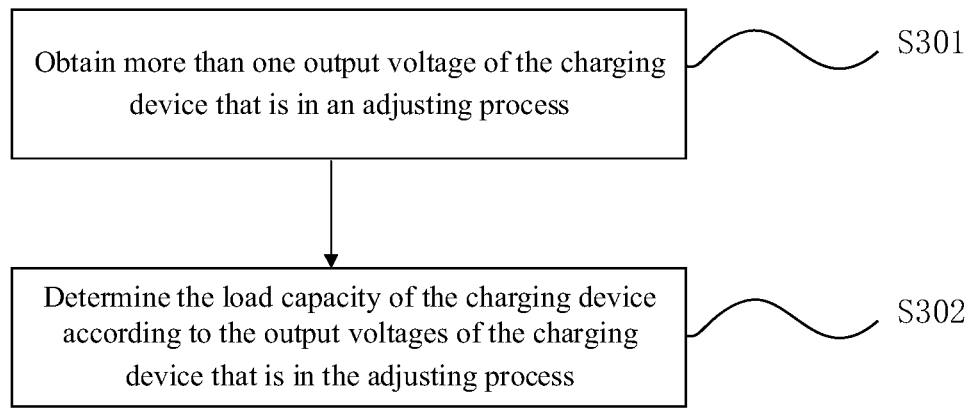
FIG. 3 is a flow diagram of a method according to an example.

In step S204, the electronic device adaptively determines the charging mode according to the load capacity of the charging device. This improves the charging efficiency to the greatest extent without breaks in the charging. In an example, the method includes steps S110 to S130. Step S120 includes steps S201 to S204. As shown in FIG. 3, in step S203, determining the load capacity of the charging device may include the following. In S301, more than one output voltage of the charging device that is in an adjusting process is obtained. In S302, the load capacity of the charging device is determined according to the output voltages of the charging device that is in the adjusting process.

In step S301, the charging device is configured to: adjust the output voltage or an output current according to an adjusting mode indicated by the electronic device. In this step, the electronic device may indicate the adjusting mode by sending an indication information. The indication information includes: an initial output voltage and an initial output current of the charging device, and the adjusting mode of the charging device.

For example, the electronic device may automatically generate the indication information after recognizing that the charging device is the non-adaptive-type charging device. The electronic device may determine the load capacity of the non-adaptive-type charging device in a test mode. The indication information may be encapsulated in a data packet sent by the electronic device based on the PD protocol, and the data packet may be a Vendor Defined Message (VDM) data packet.

After the electronic device sends the indication information, the charging device may adjust the initial output voltage or the initial output current according to the adjusting mode indicated in the indication information, so as to adjust the charging voltage for the electronic device. In the process of adjusting the initial output voltage or the initial output current, the electronic device may obtain the output voltage changes of the charging device in real time, and may record the output voltages of the charging device in real time. In step S302, the electronic device may determine the load capacity of the charging device according to the more than one output voltage recorded in step S301.

In a first example, the adjusting mode includes a first manner, and the first manner includes increasing the output voltage from the initial output voltage by an amount corresponding to a preset voltage step. In combination with step S301, the charging device increases the output voltage from the initial output voltage according to the adjusting mode in a step-by-step manner. For example, the initial output voltage is 5 V and the preset voltage step is 100 mV. The charging device increases step by step, the 5V output voltage in 100 mV steps. The charging device stops increasing the output voltage when the number of voltage steps performed reaches a preset number. For example, the preset number of step increases may be set to 10. In combination with step S302, the electronic device may obtain the more than one output voltage in adjusting process.

Step S302 of this example includes S303-1. In S303-1, in a case where at least one output voltage among the more than one output voltage is greater than or equal to the first threshold voltage, it is determined that the load capacity of the charging device is a first class. In this step, a charging mode corresponding to the first class is the first mode. In a case where at least one output voltage among the multiple output voltages reaches the first threshold voltage, it is determined that the load capacity is the first class. In combination with the aforementioned examples, the first threshold voltage may be set to be about twice the rated voltage, for example, 10 V. An output voltage greater than or equal to 10 V in the more than one output voltage indicates that the voltage of the charging device can be increased to the first threshold voltage, and the first mode may be adopted for charging.

In this example, on the basis of step S303-1, step S204 is performed and includes S204-1. In S204-1, in a case where the load capacity is the first class, it is determined that the charging mode is the first mode. Based on this determination, the electronic device may be charged in the first mode.

In a second example, the adjusting mode includes a second manner, and the second manner includes increasing the output current from the initial output current according to an amount corresponding to a preset current step. In combination with step S301, the charging device increases the output current from the initial output current according to the adjusting mode step by step, and stops increasing the output current in a case where the number of step increases reaches a preset number. For example, the preset number of step increases may be set to be ten (10). For example, in a case in which the initial output current is 2 A and the preset current step is 200 mA, the charging device increases, step by step, the output current from 2 A by steps of 200 mA each step.

It may be understood that the output voltage of the charging device is decreased gradually in accordance with the gradually increasing output current. Increasing the output current in this manner can test whether the output voltage of the charging device may be decreased to the desired low voltage, for example, decreased to the second threshold. In combination with step S302, the electronic device may obtain more than one output voltage in the adjusting process.

In this example, step S302 includes S303-2. In S303-2, in a case where at least one output voltage is smaller than or equal to the second threshold, it is determined that the load capacity of the charging device is a second class. In this step, the charging mode corresponding to the second class is the second mode. The second threshold may be set to a minimum voltage of the battery, for example, 3.6 V. In a case where the output voltage is smaller than or equal to the second threshold in the more than one output voltage, the voltage of the charging device may be decreased to the second threshold, and the second mode may be adopted for charging.

In this example, on the basis of step S303-2, step S204 includes S204-2. In S204-2, in response to the load capacity being determined to be the second class, it is determined that the charging mode is the second mode. On this basis, the electronic device may be charged in the second mode. For example: the first threshold is 10 V, the rated voltage of the battery is 4.5 V, and the minimum voltage is 3.6 V. Among the more than one output voltage of the charging device, the maximum output voltage is 10 V or 11 V, and the minimum output voltage is 4 V. Thus, the first mode may be adopted.

For another example: the first threshold is 10 V, the second threshold is 3.6 V, the rated voltage of the battery is 4.5 V, and the minimum voltage is 3.6 V. Among the more than one output voltage of the charging device, the minimum output voltage is 3.6V, and the maximum output voltage is 8V. Thus, the second mode may be adopted. It may be understood that, if at least one output voltage in the more than one output voltage is greater than or equal to the first threshold, and at least one other output voltage is smaller than or equal to the second threshold, the first mode may be adopted by default.

In a third example, the charging mode further includes a third mode, and a charging current of the third mode is smaller than a current threshold. For example, the charging current of the third mode is 2 A. In this example, step S302 includes S303-3. In S303-3, in response to all the output voltages in the more than one output voltage being greater than the second threshold and smaller than the first threshold, it is determined that the load capacity of the charging device is a third class. In this step, a charging mode corresponding to the third class is the third mode. In an instance of this example, during the adjusting and detecting processes of the charging device, the output voltages of the charging device do not satisfy the condition that the output voltage is greater than or equal to the first threshold, nor do they satisfy the condition that the output voltage is smaller than or equal to the second threshold. That is, neither a charging requirement of the first mode nor a charging requirement of the second mode can be satisfied, and therefore, the load capacity is weakest.

In this example, on the basis of step S303-3, step S204 includes S204-3. In S204-3, in response to the load capacity being the third class, it is determined that the charging mode is the third mode. The electronic device may be stably charged by adopting a low-current mode, for example, being charged under the condition of 5 V and 2 A. In an example, the method according to the present example includes steps S110 to adaptive-S310. Step S130 includes: controlling a charging chip in the electronic device to be switched to the first mode for charging, or controlling the charging chip to be switched to the second mode for charging, or controlling the charging chip to be turned off and controlling a power management chip in the electronic device i to be switched to the third mode for charging.

Both the charging chip (charge IC) and the power management chip (PMIC) communicate with a processor (AP). The processor of the electronic device is configured by processor-executable instructions to perform the methods of the aforementioned examples. The determined charging modes can vary, and the chips involved in switching the charging modes can vary. In this example, the charging chip may include two charge pump chips. Under a control signal of the processor, the charging chip may be switched to the first mode or the second mode to charge the battery of the electronic device. In the first mode, the charging voltage may be controlled to be about twice the current voltage of the battery, and in that case, the charging efficiency reaches about 95%. In the second mode, the charging voltage may be controlled to be the current voltage of the battery plus one voltage difference, and the charging efficiency reaches about 92%.

In the case that the load capacity of the charger is weak, the first mode and the second mode cannot be realized. In this case, the charging chip will be switched to the third mode. The processor turns off the charging chip and controls the PMIC to charge in the third mode. In the third mode, the charging current and the charging power are smaller compared with that of the first two modes.

According to the method in the examples of the disclosure, the electronic device may detect or recognize the type of the charging device and the load capacity of the charging device. The electronic device selects the proper charging mode. According to the disclosure herein, the non-adaptive-type of charging device is compatible with electronic devices. Even if the charging device is the non-adaptive charging device, the electronic device still can be charged. In addition, when connected with the adaptive-type charging device, the electronic device may be rapidly charged with high power, while ensuring the charging efficiency and reducing heating of the electronic device.

Figure 4:
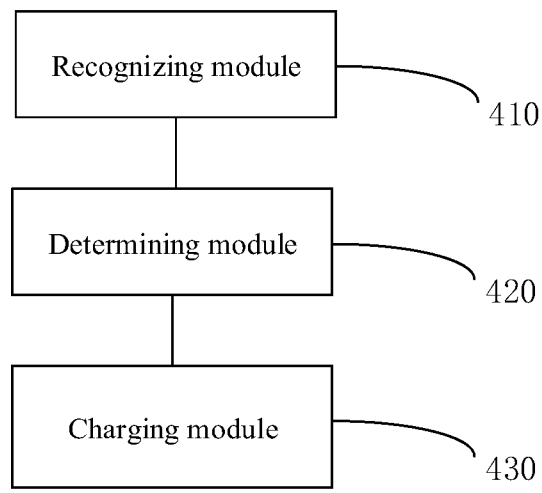
FIG. 4 is a block diagram of an apparatus according to an example.

In an example, the disclosure further provides a charging apparatus, which is implemented as an electronic device. As shown in FIG. 4, the apparatus according to the present example includes: a recognizing module 410, a determining module 420, and a charging module 430. The apparatus according to the present example is configured to implement the method as shown in FIG. 1. The recognizing module 410 is configured to recognize a type of charging device in response to being connected to the charging device. The types of the charging devices may include an adaptive-type charging device and a non-adaptive-type charging device.

The determining module 420 is configured to determine a corresponding charging mode according to the type of the charging device. The charging mode includes at least a first mode and a second mode. A charging voltage of the first mode can reach a first threshold voltage. A charging voltage of the second mode can reach a second threshold voltage. The first threshold voltage is greater than a rated voltage of a battery. The rated voltage is greater than the second threshold voltage. The charging module 430 is configured to charge the electronic device in the determined charging mode.

Still referring to FIG. 4, the apparatus according to the present example is further configured to perform actions corresponding to the method as shown in FIG. 2. The determining module 420 is configured to: in response to the type of the charging device is the adaptive-type charging device, determine that the charging mode is the first mode. In this example, the determining module 420 is further configured to: determine a load capacity of the charging device in response to the type of the charging device, which is the non-adaptive-type charging device; and determine the charging mode according to the load capacity.

Still referring to FIG. 4, the apparatus according to the present example is further configured to perform the actions corresponding to the method as shown in FIG. 3. The determining module 420 is further configured to: obtain more than one output voltage of the charging device in an adjusting process. The charging device is configured to: adjust the output voltage or an output current according to an adjusting mode indicated by the electronic device. The load capacity of the charging device is determined according to the output voltages of the charging device in the adjusting process.

In this example, the adjusting mode includes a first manner. The first manner includes increasing the output voltage from an initial output voltage by amounts corresponding to a preset voltage step. The determining module 420 is further configured to: determine that the load capacity of the charging device is a first class in response to at least one output voltage in the more than one output voltage being greater than or equal to the first threshold, in which case a charging mode corresponding to the first class is the first mode.

In this example, the adjusting mode includes a second manner, and the second manner includes increasing the output current from an initial output current by an amount corresponding to a preset current step. The determining module 420 is further configured to: determine that the load capacity of the charging device is a second class in response to at least one output voltage in the more than one output voltage being smaller than or equal to the second threshold, in which case a charging mode corresponding to the second class is the second mode.

In this example, the charging mode further includes a third mode, and a charging current of the third mode is smaller than a current threshold. The determining module 420 is further configured to: determine that the load capacity of the charging device is a third class in response to all the output voltages in the more than one output voltage being greater than the second threshold and smaller than the first threshold, in which case a charging mode corresponding to the third class is the third mode.

Figure 5:
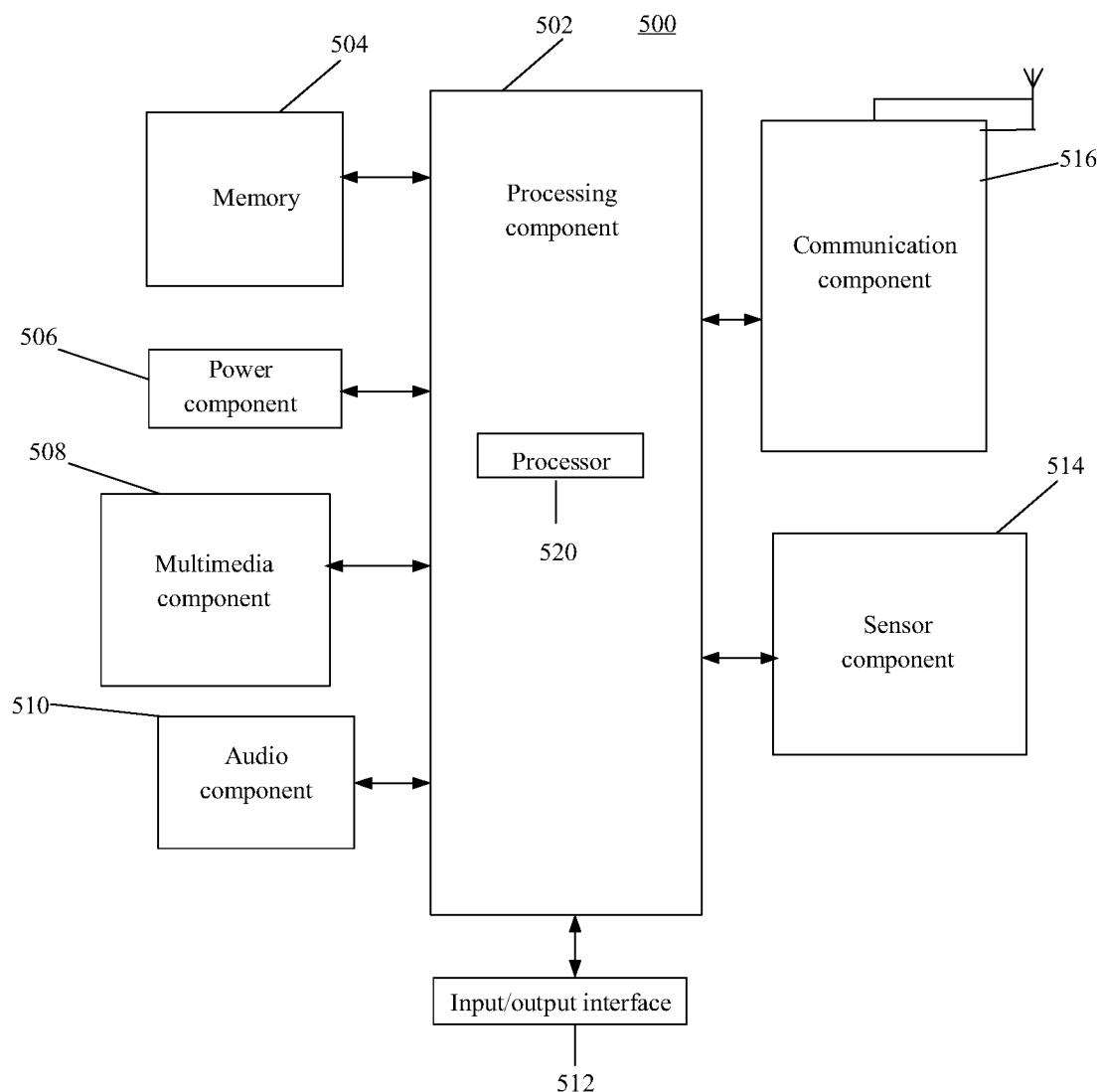
FIG. 5 is a block diagram of an electronic device according to an example.

FIG. 5 shows a block diagram of an electronic device. The disclosure further provides an electronic device. For example, the electronic device 500 may be a mobile telephone, a computer, a digital broadcast terminal, a message sending/receiving device such as a transceiver, a game console, a tablet device, a medical device, a fitness device, a personal digital assistant, and the like. The electronic device 500 may include one or more of the following components: a processing component 502, a memory 504, an electrical component 506, a multimedia component 508, an audio component 510, an input/output (I/O) interface 512, a sensor component 514, and a communication component 516.

The processing component 502 usually controls the overall operation of the electronic device 500, such as operations associated with displaying, telephone calling, data communication, camera operation, and record operation. The processing component 502 may include one or more processors 520 to execute processor-executable instructions, so as to configure the electronic device to perform all or part of the steps of the above method. In addition, the processing component 502 may include one or more modules, so as to facilitate interaction between the processing component 502 and other components. For example, the processing component 502 may include a multimedia module, so as to facilitate interaction between the multimedia component 508 and the processing component 502.

The memory 504 is configured to store various types of data so as to support operations on the device 500. Examples of these data include instructions of any application programs or methods configured to be operated on the device 500, contact data, telephone directory data, messages, pictures, videos, and the like. The memory 504 may be implemented by any type of volatile or nonvolatile storage device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 506 provides electric power for various components of the device 500. The electrical component 506 may include a power management system, one or more power sources, and other components associated with generating, managing and distributing electric power for the device 500.

The multimedia component 508 includes a screen providing an output interface between the device 500 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors to sense touching, swiping, and gestures on the touch panel. The touch sensor may not only sense a boundary of a touching or swiping action, but also detect duration and pressure related to the touching or swiping operation. In some examples, the multimedia component 508 includes a front camera and/or a back camera. When the device 500 is in an operation mode, such as a shooting mode or a video mode, the front camera and/or the back camera may receive external multimedia data. Each front camera and each back camera may be a fixed optical lens system or have a focal length and optical zooming capability.

The audio component 510 is configured to output and/or input an audio signal. For example, the audio component 510 includes a microphone (MIC). When the device 500 is in the operation mode, such as a call mode, a recording mode, or a speech recognition mode, the microphone is configured to receive an external audio signal. The received audio signal may be further stored in the memory 504 or sent via the communication component 516. In some examples, the audio component 510 further includes a speaker for outputting an audio signal.

The I/O interface 512 provides an interface between the processing component 502 and a peripheral interface module, and the above peripheral interface module may be a keyboard, a click wheel, buttons, etc. These buttons may include, but are not limited to: a home button, a volume button, a start button, and a lock button.

The sensor component 514 includes one or more sensors for providing state evaluations of all aspects for the device 500. For example, the sensor component 514 may detect an on/off state of the device 500 and relative positioning of components, for example, the components are a display and a keypad of the device 500. The sensor component 514 may further detect position change of the device 500 or one component of the device 500, whether there is contact between the user and the device 500, azimuth or acceleration/deceleration of the device 500, and temperature change of the device 500. The sensor component 514 may include a proximity sensor, configured to detect existence of a nearby object without any physical contact. The sensor component 514 may further include an optical sensor, such as a CMOS or CCD image sensor, for use in an imaging application. In some examples, the sensor component 514 may further include an acceleration sensor, a gyroscope sensor, a magnetic sensor, a pressure sensor, or a temperature sensor.

The communication component 516 is configured to facilitate wired or wireless communication between the device 500 and other devices. The device 500 may access a wireless network which is based on a communication standard, such as WiFi, 2G or 3G, or their combination. In an example, the communication component 516 receives a broadcast signal or related broadcast information from an external broadcast management system via a broadcast channel. In an example, the communication component 516 further includes a near-field communication (NFC) module so as to facilitate short-range communication. For example, the NFC module may be implemented based on a radio frequency identification (RFID) technology, an infrared data association (IrDA) technology, an ultra-wideband (UWB) technology, a Bluetooth (BT) technology and other technologies.

In the example, the device 500 may be implemented by one or more of application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method.

Another example in the disclosure provides a non-transitory computer-readable storage medium, such as a memory 504 including instructions. The above instructions may be executed by the processor 520 of the device 500 so as to complete the above method. For example, the computer-readable storage medium may be an ROM, a random access memory (RAM), a CD-ROM, a magnetic tape, a floppy disk, an optical data storage device, and the like. The instruction in the storage medium, when executed by a processor of an electronic device, causes the electronic device to be capable of executing the above method.

The technical solution provided by the example of the disclosure may include the following beneficial effects: by adopting the method according to the disclosure, the electronic device may firstly recognize the type of the connected charging device, and the charging mode is dynamically adjusted according to the type of the charging device. Thus, the electronic device may adopt a proper charging mode to be charged, improving the user experience.

Those skilled in the art will easily figure out other implementations of the disclosure after considering the specification and practicing the disclosure disclosed here. The disclosure intends to cover any variations, usages, or adaptive changes of the disclosure, and these variations, usages, or adaptive changes conform to general principles of the disclosure and include common general knowledge or conventional technical means that are not disclosed herein in the technical field. The specification and the examples are only regarded as exemplary, and the true scope and spirit of the disclosure are indicated by the following claims.

It will be appreciated that the disclosure is not limited to the exact construction that has been described above and shown in the accompanying drawings, and that various modifications and changes may be made without departing from the scope thereof. It is intended that the scope of the disclosure only be limited by the appended claims.

What is claimed is:

1. A charging method, performed by an electronic device, and comprising:
   recognizing a type of a charging device in response to the electronic device being connected to the charging device, wherein the types of the charging devices comprise an adaptive-type charging device and a non-adaptive-type charging device, the adaptive-type charging device refers to a charging device that is effectively connected with and compatible with the electronic device, and the non-adaptive-type charging device refers to a charging device that is not effectively connected with and not compatible with the electronic device;
   determining a corresponding charging mode according to the type of the charging device, wherein the charging mode comprises at least a first mode and a second mode, wherein a charging voltage of the first mode can reach a first threshold voltage and a charging voltage of the second mode can reach a second threshold voltage, wherein the first threshold voltage is greater than a rated voltage of a battery, and wherein the rated voltage is greater than the second threshold voltage; and
   charging the electronic device in the determined charging mode;
   wherein determining the corresponding charging mode according to the type of the charging device comprises:
   determining a load capacity of the charging device in response to determining that the type of the charging device is the non-adaptive-type charging device; and
   determining the charging mode according to the load capacity;
   wherein determining the load capacity of the charging device comprises:
   obtaining more than one output voltage of the charging device in an adjusting process, wherein the charging device is configured to adjust either the output voltage or an output current according to an adjusting mode indicated by the electronic device; and
   determining the load capacity of the charging device according to the output voltages of the charging device during the adjusting process.

2. The charging method according to claim 1, wherein the adjusting mode comprises a first manner, and the first manner includes increasing the output voltage from an initial output voltage by an amount determined by a preset voltage step; and wherein determining the load capacity of the charging device according to the output voltages of the charging device in the adjusting process comprises:
   in a case where at least one output voltage among the more than one output voltage is greater than or equal to the first threshold, determining that the load capacity of the charging device is a first class, wherein a charging mode corresponding to the first class is the first mode.

3. The charging method according to claim 1, wherein the adjusting mode comprises a second manner, and the second manner includes increasing the output current from an initial output current by an amount corresponding to a preset current step; and wherein determining the load capacity of the charging device according to the output voltages of the charging device in the adjusting process comprises:
   in a case where at least one output voltage among the more than one output voltage is smaller than or equal to the second threshold, determining that the load capacity of the charging device is a second class, wherein a charging mode corresponding to the second class is the second mode.

4. The charging method according to claim 1, wherein the charging mode further comprises a third mode, and a charging current of the third mode is smaller than a current threshold; and wherein determining the load capacity of the charging device according to the output voltages of the charging device in the adjusting process comprises:
   in a case where all the output voltages among the more than one output voltage are greater than the second threshold and smaller than the first threshold, determining that the load capacity of the charging device is a third class, wherein a charging mode corresponding to the third class is the third mode.

5. The charging method according to claim 4, wherein charging the electronic device in the determined charging mode comprises one of the following:
   controlling a charging chip in the electronic device to be switched to the first mode for charging;
   controlling the charging chip to be switched to the second mode for charging; or
   controlling the charging chip to be turned off, and controlling a power management chip in the electronic device to be switched to the third mode for charging.

6. An electronic device, comprising:
   one or more processors; and
   a memory configured to store processor-executable instructions;

wherein the processor-executable instructions, when collectively executed by the one or more processors, cause the electronic device to:
recognize a type of a charging device in response to the electronic device being connected to the charging device, wherein the types of the charging devices comprise an adaptive-type charging device and a non-adaptive-type charging device, the adaptive-type charging device refers to a charging device that is effectively connected with and compatible with the electronic device, and the non-adaptive-type charging device refers to a charging device that is not effectively connected with and not compatible with the electronic device;
determine a corresponding charging mode according to the type of the charging device, wherein the charging mode comprises at least a first mode and a second mode, a charging voltage of the first mode can reach a first threshold, a charging voltage of the second mode can reach a second threshold, the first threshold is greater than a rated voltage of a battery, and the rated voltage is greater than the second threshold; and
charge the electronic device in the corresponding charging mode;
wherein determining the corresponding charging mode according to the type of the charging device comprises:
determining a load capacity of the charging device in response to determining that the type of the charging device is the non-adaptive-type charging device; and
determining the charging mode according to the load capacity;
wherein determining the load capacity of the charging device comprises:
obtaining more than one output voltage of the charging device in an adjusting process, wherein the charging device is configured to adjust either the output voltage or an output current according to an adjusting mode indicated by the electronic device; and
determining the load capacity of the charging device according to the output voltages of the charging device during the adjusting process.

7. The electronic device according to claim 6, wherein the adjusting mode comprises a first manner, and the first manner includes increasing the output voltage from an initial output voltage by an amount corresponding to a preset voltage step; and
the processor-executable instructions, when collectively executed by the one or more processors, further cause the electronic device to:
determine that the load capacity of the charging device is a first class in a case where at least one output voltage among the more than one output voltage is greater than or equal to the first threshold, wherein a charging mode corresponding to the first class is the first mode.

8. The electronic device according to claim 6, wherein the adjusting mode comprises a second manner, and the second manner includes increasing the output current from an initial output current by an amount corresponding to a preset current step; and
the processor-executable instructions, when collectively executed by the one or more processors, further cause the electronic device to:
determine that the load capacity of the charging device is a second class in a case where at least one output voltage among the more than one output voltage is smaller than or equal to the second threshold, wherein a charging mode corresponding to the second class is the second mode.

9. The electronic device according to claim 6, wherein the charging mode further comprises a third mode, and a charging current of the third mode is smaller than a current threshold; and
the processor-executable instructions, when collectively executed by the one or more processors, further cause the electronic device to:
determine that the load capacity of the charging device is a third class in a case where all the output voltages among the more than one output voltage are greater than the second threshold and smaller than the first threshold, wherein a charging mode corresponding to the third class is the third mode.

10. The electronic device according to claim 9, wherein the processor-executable instructions, when collectively executed by the one or more processors, further cause the electronic device to perform one of the following:
control a charging chip in the electronic device to be switched to the first mode for charging;
control the charging chip to be switched to the second mode for charging; or
control the charging chip to be turned off, and control a power management chip in the electronic device to be switched to the third mode for charging.

11. A non-transitory computer-readable storage medium storing processor-executable instructions, wherein the processor-executable instructions, when collectively executed by one or more processors of an electronic device, cause the electronic device to:
recognize a type of a charging device in response to the electronic device being connected to the charging device, wherein the types of the charging devices comprise an adaptive-type charging device and a non-adaptive-type charging device, the adaptive-type charging device refers to a charging device that is effectively connected with and compatible with the electronic device, and the non-adaptive-type charging device refers to a charging device that is not effectively connected with and not compatible with the electronic device;
determine a corresponding charging mode according to the type of the charging device, wherein the charging mode comprises at least a first mode and a second mode, wherein a charging voltage of the first mode can reach a first threshold voltage, a charging voltage of the second mode can reach a second threshold voltage, the first threshold voltage is greater than a rated voltage of a battery, and the rated voltage is greater than the second threshold voltage; and
charge the electronic device in the determined charging mode;
wherein determining the corresponding charging mode according to the type of the charging device comprises:
determining a load capacity of the charging device in response to determining that the type of the charging device is the non-adaptive-type charging device; and
determining the charging mode according to the load capacity;
wherein determining the load capacity of the charging device comprises:
obtaining more than one output voltage of the charging device in an adjusting process, wherein the charging device is configured to adjust either the output voltage or an output current according to an adjusting mode indicated by the electronic device; and determining the load capacity of the charging device according to the output voltages of the charging device during the adjusting process.

12. The storage medium according to claim 11, wherein the adjusting mode comprises a first manner, and the first manner includes increasing the output voltage from an initial output voltage by an amount corresponding to a preset voltage step; and the processor-executable instructions, when collectively executed by the one or more processors, further cause the electronic device to:

determine that the load capacity of the charging device is a first class in a case where at least one output voltage among the more than one output voltage is greater than or equal to the first threshold, wherein a charging mode corresponding to the first class is the first mode.

13. The storage medium according to claim 11, wherein the adjusting mode comprises a second manner, and the second manner includes increasing the output current from an initial output current by an amount corresponding to a preset current step; and the processor-executable instructions, when collectively executed by the one or more processors, further cause the electronic device to:

determine that the load capacity of the charging device is a second class in a case where at least one output voltage among the more than one output voltage is smaller than or equal to the second threshold, wherein a charging mode corresponding to the second class is the second mode.

14. The storage medium according to claim 11, wherein the charging mode further comprises a third mode, and wherein a charging current of the third mode is smaller than a current threshold; and the processor-executable instructions, when collectively executed by the one or more processors, further cause the electronic device to:

determine that the load capacity of the charging device is a third class in a case where all the output voltages among the more than one output voltage are greater than the second threshold and smaller than the first threshold, wherein a charging mode corresponding to the third class is the third mode.

15. The charging method according to claim 1, wherein the non-adaptive-type charging device has at least one of the following characteristics:

a charging voltage of the non-adaptive-type charging device does not reach a high-voltage threshold, preventing the electronic device from being charged in a high-voltage mode;

a charging voltage of the non-adaptive-type charging device does not reach a low-voltage threshold, preventing the electronic device from being charged in a low-voltage mode; or causing the electronic device to be unable to implement fast charging, even if the electronic device supports the fast charging.

16. The charging method according to claim 1, wherein the load capacity indicates a maximum charging voltage capability or a minimum charging voltage capability of the charging device.

* * * * *